United States Patent
Bordes et al.

(10) Patent No.: US 10,694,209 B2
(45) Date of Patent: *Jun. 23, 2020

(54) METHOD FOR ENCODING AND METHOD FOR DECODING A LUT AND CORRESPONDING DEVICES

(71) Applicant: DOLBY LABORATORIES LICENSING CORPORATION, San Francisco, CA (US)

(72) Inventors: Philippe Bordes, Laille (FR); Pierre Andrivon, Liffre (FR); Emmanuel Jolly, Rennes (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,764

(22) Filed: Sep. 10, 2018

(65) Prior Publication Data

US 2019/0007703 A1 Jan. 3, 2019

Related U.S. Application Data

(63) Continuation of application No. 14/783,062, filed as application No. PCT/EP2014/055333 on Mar. 17, 2014, now Pat. No. 10,097,857.

(30) Foreign Application Priority Data

Apr. 8, 2013 (EP) ..................... 13305453
Jul. 15, 2013 (EP) ..................... 13306010
Jan. 27, 2014 (EP) ..................... 14305109

(51) Int. Cl.
*H04N 7/12* (2006.01)
*H04N 19/597* (2014.01)
(Continued)

(52) U.S. Cl.
CPC ......... *H04N 19/597* (2014.11); *H04N 19/186* (2014.11); *H04N 19/30* (2014.11);
(Continued)

(58) Field of Classification Search
CPC ...... H04N 19/186; H04N 19/30; H04N 19/44; H04N 19/463; H04N 19/50; H04N 19/597; H04N 19/96
See application file for complete search history.

(56) References Cited

U.S. PATENT DOCUMENTS 4,694,404 A 9/1987 Meagher
6,567,081 B1 5/2003 Li
(Continued)

FOREIGN PATENT DOCUMENTS

CN 102592293 7/2012
EP 0152741 11/1988
(Continued)

OTHER PUBLICATIONS

Ahn: "SIMD Optimization of Tetrahedral Interpolation for Color Management System", Korea institute of information technology 9(5) pp. 93-101, 2011.
(Continued)

*Primary Examiner* — Md N Haque

(57) ABSTRACT

A method for encoding a LUT defined as a lattice of vertices is disclosed. At least one value is of each vertex of the lattice. The method comprises for a current vertex:
 predicting the at least one value of said current vertex from another value which is for example obtained from reconstructed values of neighboring vertices; and
 encoding in a bitstream at least one residue computed between the at least one value of the current vertex and its prediction in a bitstream.

10 Claims, 9 Drawing Sheets

(51) Int. Cl.
    *H04N 19/50*       (2014.01)
    *H04N 19/30*       (2014.01)
    *H04N 19/463*     (2014.01)
    *H04N 19/186*     (2014.01)
    *H04N 19/44*       (2014.01)
    *H04N 19/96*       (2014.01)

(52) U.S. Cl.
    CPC ........... *H04N 19/44* (2014.11); *H04N 19/463* (2014.11); *H04N 19/50* (2014.11); *H04N 19/96* (2014.11)

(56) References Cited

U.S. PATENT DOCUMENTS

| | | |
|---|---|---|
| 7,002,571 B2 | 2/2006 | Lake |
| 7,265,870 B2 | 9/2007 | Valde |
| 7,925,103 B2 | 4/2011 | Lee |
| 8,169,434 B2 | 5/2012 | Zhou |
| 8,358,303 B2 | 1/2013 | Kim |
| 8,804,816 B2 | 8/2014 | Li |
| 8,861,587 B2 | 10/2014 | Sjoberg |
| 2003/0076881 A1 | 4/2003 | Akiyoshi |
| 2005/0128286 A1* | 6/2005 | Richards ............. G06F 3/04815 348/36 |
| 2006/0268297 A1* | 11/2006 | Han ...................... H04N 1/6019 358/1.9 |
| 2007/0242894 A1 | 10/2007 | Kautzer |
| 2009/0016598 A1* | 1/2009 | Lojewski .............. G06T 17/005 382/154 |
| 2010/0082703 A1 | 4/2010 | Zhou |
| 2013/0034166 A1* | 2/2013 | Shiodera ............. H04N 19/105 375/240.16 |
| 2013/0177072 A1 | 7/2013 | Shibahara |
| 2014/0040215 A1* | 2/2014 | Cai ....................... G06T 17/005 707/693 |
| 2014/0324753 A1 | 10/2014 | Grosof |
| 2016/0173881 A1 | 6/2016 | Alshina |
| 2016/0295219 A1* | 10/2016 | Ye ............................ G06T 9/40 |

FOREIGN PATENT DOCUMENTS

| | | |
|---|---|---|
| EP | 0822708 | 2/1998 |
| EP | 1321893 | 6/2003 |
| EP | 1431919 | 6/2004 |
| EP | 1574996 | 9/2005 |
| EP | 2051529 | 4/2009 |
| JP | H06-95636 | 4/1994 |
| JP | 2004-208128 | 7/2004 |
| JP | 2010-251940 | 11/2010 |
| JP | 6353896 | 7/2018 |
| RU | 2447607 | 4/2012 |
| WO | 2012/044886 | 4/2012 |

OTHER PUBLICATIONS

Andrivon Etal_JCTVC P0127: "AHG 14 on a profile supporting bit depth and color gamut scalability in HEVC scalable extension", JCT-VC of ITU-TSG 16 WP 3 and ISO/IEC JTC 1/SC 29/WG 11, 16th Meeting: San Jose, US, Jan. 9-17, 2014.
Andrivon_Etal_JCTVC N0163: "AHG14 wide color gamut test material creation", JCT-VC of ITU-T SG 16 WP 3 and ISO/IEC JTC 1/SC 29/WG 11, 14th Meeting: Vienna, AT, Jul. 25-Aug. 2, 2013.
Auyeung_Etal_JCTVC R0163: "SCE1 test 5.2 results on color gamut scalability by matrix mapping", JCT-VC of ITU-T SG 16 WP 3 and ISO/IEC JTC 1/SC 29/WG 11, 18th Meeting: Sapporo, JP, Jun. 30-Jul. 9, 2014.
Bin Etal: "Applications of tetrahedral interpolation in color conversion model", 2003 International Conference on Computer Science and Software Engineering.
Bjontegaard_Etal_VCEGAl11: "Improvement of the BD PSNR model", ITU—Telecommunications Standardization Sector, Video Coding Experts Group (VCEG), 35th Meeting: Berlin, Germany, Jul. 16-18, 2008.
Bordes_Etal: "Color gamut scalable video coding for SHVC", 30th Picture Coding Symposium (PCS-2013), Dec. 8-11, 2013, San Jose, California.
Bordes_Etal: "SHVC color gamut scalability", submitted for publication IEEE transactions on image processing, Feb. 6, 2015.
Bordes_Etal_JCTVC N0168: "AGH14 color gamut scalable video coding using 3D LUT new results", JCT-VC of ITU-T SG 16 WP 3 and ISO/IEC JTC 1/SC 29/WG 11, 14th Meeting: Vienna, AT, Jul. 25-Aug. 2, 2013.
Bordes_Etal_JCTVC P0128: "SCE1 results on core experiment on color gamut and bit depth scalability tests 1A_1B", JCT-VC of ITU-T SG 16 WP 3 and ISO/IEC JTC 1/SC 29/WG 11, 16th Meeting: San Jose, US, Jan. 9-17, 2014.
Bross_Etal_JCTVC-L1003: "HEVC text specification draft 10", JCTVC 12th Meeting: Geneva, CH, Jan. 14-23, 2013.
Bugdayci Etal: "SCE1 test 5.1 results on improved weighted prediction for color gamut scalability", JCTVC-R0239, ITU-T SG 16 WP 3 and ISO/IEC JTC 1/SC 29/WG 11, 18th Meeting: Sapporo, JP, Jun. 30-Jul. 9, 2014.
Chen etal: "SHVC working draft 1", 12th Meeting: Geneva, CH, Jan. 14-23, 2013.
Chen_Etal_JCTVC R1008: "High efficiency video coding (HEVC) scalable extension draft 7", JCTVC 18th Meeting: Sapporo, JP, Jun. 30-Jul. 9, 2014.
Digital Cinema Initiatives 2014_StEM access procedures.
Digital Cinema Initiatives LLC_Digital cinema system specification, Oct. 10, 2012.
Duenas_Etal_JCTVC00014: "JCT VC AHG report colour gamut scalability", JCTVC 15th Meeting: Geneva, CH, Oct. 23-Nov. 1, 2013.
Handa S Etal: "Two-dimensional interpolative DPCM", Electronics & Communications in Japan, Part I—Communications, Wiley, Hoboken, NJ, US, vol. 71, No. 5, May 1, 1988, pp. 116-122, XP000037096, ISSN: 8756-6621, abstract; figures 1, 2, 5, paragraph [0002].
He_Etal: "Robust 3D LUT estimation method for SHVC color gamut scalability", Visual communications and image processing (VCIP), 2014.
He_Etal_JCTVC P0186: "SCE1 combined bit depth and color gamut conversion with 3D LUT for SHVC color gamut scalability", JCTVC 16th Meeting: San Jose, USA, Jan. 9-17, 2014.
Husak_Etal_M34603: "Report of AHG on HDR and WCG", Strasbourg, FR, Oct. 2014.
ITU R SG6 W6C group working party 6C (WP 6C): "programme production and quality assessment", May 2013.
Kanamori_Etal: "A novel color transformation algorithm and its applications", Proc SPIE 1244, image processing algorithms and techniques, pp. 272-281, Jun. 1990.
Kerofsky etal: "Color gamut scalable video coding: new results", JCTVC-L0334, 12th JCTVC meeting, Geneva, CH, Jan. 14-23, 2013.
Li_Etal: "SCE1-2 color gamut scalability with asymmetric 3D LUT", JCTVC-Q0048, 17th Meeting: Valencia, ES, Mar. 27-Apr. 4, 2014.
Li_Etal_JCTVC L1009: "Common test conditions and software reference configurations for the scalable test model", JCTVC 12th Meeting: Geneva, CH, Jan. 14-23, 2013.
Li_Etal_JCTVC R0151: "Non SCE1 improved CGS partitioning on top of SHM 6", JCTVC 18th Meeting: Sapporo, JP, Jun. 30-Jul. 9, 2014.
Luthra_Etal: "Requirements for the scalable enhancement of HEVC", ISO/IEC JTC1/SC29/WG11M24484, Apr. 2012. Geneva, Switzerland.
Luthra_Etal: "Use cases for the scalable enhancement of HEVC", ISO/IEC JTC1/SC29/WG11M24483, Apr. 2012, Geneva, Switzerland.
Moore: "On the reciprocal of the general algebraic matrix", Bulletin of the American Mathematical society vol. 26, issue 9, pp. 394-395.
Philippe Bordes etal: "AHG14: Color Gamut Scalable Video Coding using 3D LUT", 104. MPEG meeting; Apr. 22, 2013-Apr. 26, 2013; Incheon; (Motion Picture Expert Group or ISO/IEC JTC1// SC29/WG11), No. m28650, Apr. 19, 2013, XP030057183, the whole document.

(56) References Cited

OTHER PUBLICATIONS

Recommendation ITU-R BT.2020, 2012.
Recommendations ITU-T BT2020, 2012: "Parameter values for ultra high definition television systems for production and international programme exchange".
Recommendations ITU-T BT709-5, 2002: "Parameter values for the HDTV standards for production and international programme exchange".
Simple Recommended Practice: "Derivation of basic television color equations", RP177, 1993.
SMPTE Standard_ST2084: "High dynamic range electro optical transfer function of mastering reference displays", SMPTE ST 2084:2014.
SMPTE: "Initial report of the UHDTV ecosystem study group", 2013.
Sony F65 Overview webpage, retrieved on Jul. 12, 2013.
Verharen: "UHD developments in Europe", IPTV seminar Nov. 10-11, 2014.

* cited by examiner

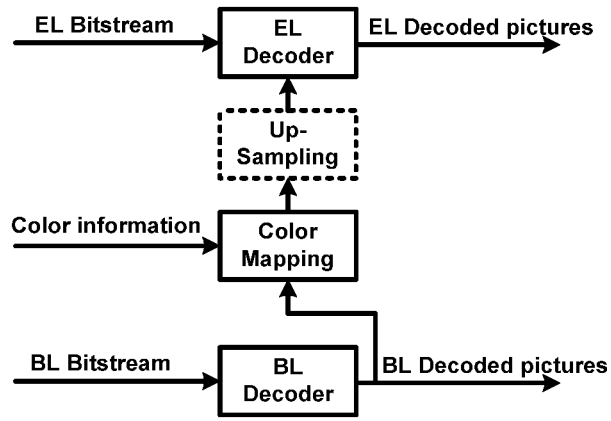
FIGURE 1 – Prior Art
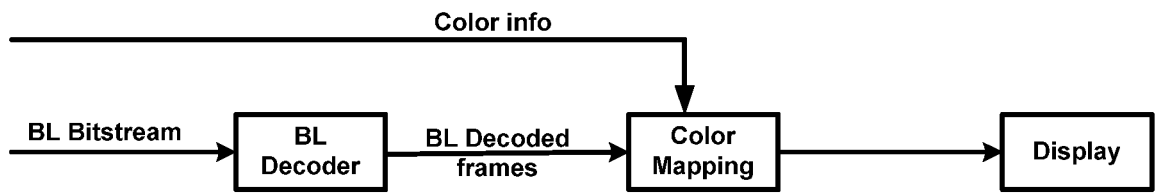
FIGURE 2 – Prior Art
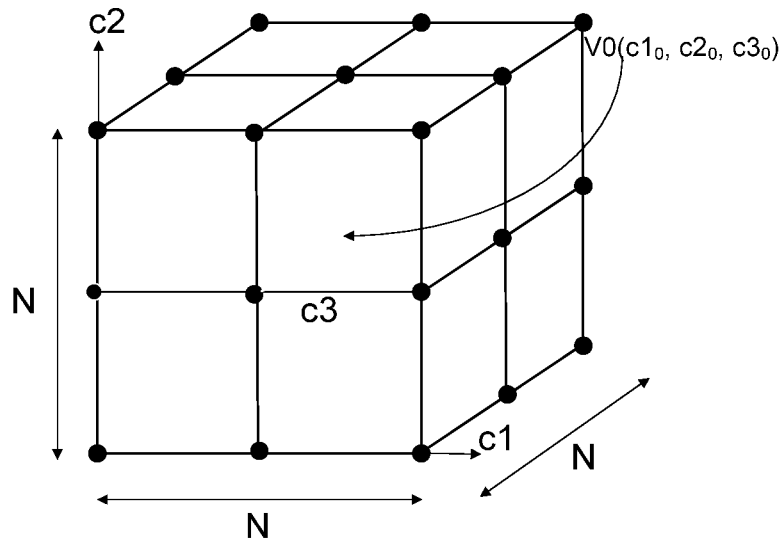
FIGURE 3 – Prior Art

US 10,694,209 B2

METHOD FOR ENCODING AND METHOD FOR DECODING A LUT AND CORRESPONDING DEVICES

CROSS-REFERENCE TO RELATED APPLICATIONS

This application is a continuation of U.S. application Ser. No. 14/783,062, filed Oct. 7, 2015. This application also claims the benefit, under 35 U.S.C. § 365 of International Application PCT/EP2014/055333, filed Mar. 17, 2014, which was published in accordance with PCT Article 21(2) on Oct. 16, 2014 in English and which claims the benefit of European patent application No. 13305453.6, filed Apr. 8, 2013; European patent application No. 13306010.3, filed Jul. 15, 2013; and European patent application No. 14305109.2, filed Jan. 27, 2014.

FIELD OF THE INVENTION

A method for encoding a Look-Up-Table defined as a lattice of vertices is disclosed, wherein at least one value is associated with each vertex of the lattice. Exemplarily, the value is a color value. A corresponding decoding method, encoding device and decoding device are disclosed.

BACKGROUND OF THE INVENTION

As depicted on FIG. 1, scalable video decoding consists in decoding (respectively encoding) a Base Layer (BL) bitstream and at least one Enhancement Layer (EL) bitstream. Usually, EL pictures are predicted from (possibly upsampled) decoded BL pictures. However, when the EL pictures and the BL pictures are represented with different color spaces and/or have been color graded differently, the prediction is less efficient. In order to improve the prediction, it is known to apply a color transform on the decoded BL pictures. More precisely, the color transform maps the colors of the BL color space (first color space) on the colors of the EL color space (second color space) using color information.

As depicted on FIG. 2, in video content distribution, a color transform is usually applied on the decoded pictures so that the transformed decoded pictures are adapted to the end device rendering capability.

This color transform is also known as Color Mapping Function (CMF). The CMF is for example approximated by a 3×3 gain matrix plus an offset (Gain-Offset model). In this case, the CMF is defined by 12 parameters. However, such an approximation of the CMF is not very precise because it assumes a linear transform model. Consequently, 3D Look Up Table (also known as 3D LUT) is used to describe such a CMF, without any a priori on the CMF model. The 3D LUT is much more precise because its size can be increased depending on the required accuracy. However, the 3D LUT may thus represent a huge data set. Transmitting a 3D LUT to a receiver thus requires encoding of the LUT.

A LUT approximating a CMF associates with at least one color value in the first color space another color value in the second color space. A LUT allows for partitioning the first color space into a set of regions delimited by the vertices of the LUT. Exemplarily, a 3D LUT associates with a triplet of color values in the first color space a set of color values. The set of color values can be a triplet of color values in the second color space or a set of color values representative of the color transform (e.g. locally defined CMF parameters) used to transform color values in the first color space into color values in the second color space.

On FIG. 3, a square 3D LUT is represented as a lattice of N×N×N vertices. For each vertex $V(c1,c2,c3)$ of the 3D LUT, a corresponding triplet of color values $(V_{c1}, V_{c2}, V_{c3})$ needs to be stored. The amount of data associated with the 3D LUT is N×N×N×K, where K is the amount of bits used to store one LUT triplet value. The triplet value is for example a (R, G, B) triplet, a (Y, U, V) triplet or a (Y, Cb, Cr) triplet, etc. Encoding all the vertex values is not efficient since it represents a huge amount of data.

BRIEF SUMMARY OF THE INVENTION

The purpose of the invention is to overcome at least one of the disadvantages of the prior art. A method for encoding a LUT defined as a lattice of vertices is disclosed. At least one value is associated with each vertex of the lattice. The encoding method comprises for a current vertex:
 predicting the at least one value associated with the current vertex from another value; and
 encoding in a bitstream at least one residue computed between the at least one value of the current vertex and its prediction in a bitstream.

Advantageously, the another value is obtained from reconstructed values associated with neighboring vertices.

According to a specific characteristic of the invention, the value is a color value.

According to a specific embodiment, the color value is representative of a color transform. According to a specific characteristic of the invention, the color value is a gain parameter or an offset.

According to a specific embodiment, the LUT is a 3D LUT encoded using an octree and three values are associated with each vertex of the lattice. In this case, the neighboring vertices used for prediction belong to a parent octant of a current octant to which the current vertex belongs.

According to a specific characteristic of the invention, predicting the at least one value associated with the current vertex from reconstructed values associated with neighboring vertices comprises interpolating the at least one value from corresponding reconstructed values of the neighboring vertices.

According to a specific characteristic, the method further comprises encoding an index in the bitstream indicating a type of interpolation.

According to a specific embodiment, encoding at least one residue comprises quantizing the at least one residue with a quantizer into a quantized residue and entropy coding the quantized residue in the bitstream and wherein the method further comprises encoding the quantizer in the bitstream.

According to a specific characteristic of the invention, a flag is encoded for the current vertex indicating whether or not at least one residue is encoded for the vertex.

According to a variant, a flag is encoded for each value of the current vertex indicating if a residue is encoded for that value or if the residue is not encoded and is inferred to be zero.

Advantageously, a split flag is encoded for the current octant indicating if its immediate children are recursively encoded or if all the residues of the vertices of all its children not yet encoded are inferred to be zero.

A method for decoding a LUT defined as a lattice of vertices is also disclosed. At least one value is associated with each vertex of the lattice. The decoding method comprises for a current vertex:

decoding at least one residue from a bitstream;
predicting the at least one value associated with the current vertex from another value; and
reconstructing the at least value of the current vertex from its prediction and the decoded at least one residue.

Advantageously, the another value is obtained from reconstructed values associated with neighboring vertices.

According to a specific characteristic of the invention, the value is a color value.

According to a specific embodiment, the color value is representative of a color transform. According to a specific characteristic of the invention, the color value is a gain parameter or an offset.

According to a specific embodiment, the LUT being a 3D LUT decoded using an octree and three values being associated with each vertex of the lattice, the neighboring vertices belong to a parent octant of a current octant to which the current vertex belong.

According to a specific characteristic of the invention, predicting the at least one value associated with the current vertex from reconstructed values associated with neighboring vertices comprises interpolating the at least one value from corresponding reconstructed values of the neighboring vertices.

According to a specific characteristic, the method further comprises decoding an index from the bitstream indicating a type of interpolation.

According to a specific embodiment, decoding at least one residue comprises entropy decoding a quantized residue from the bitstream and inverse quantizing the quantized residue with a quantizer into a decoded residue and wherein the method further comprises decoding the quantizer from the bitstream.

According to a specific characteristic of the invention, a flag is decoded for each vertex indicating whether or not at least one residue is encoded for the vertex.

According to a variant, a flag is decoded for each value of the current vertex indicating if a residue is decoded for that value or if the residue is inferred to be zero.

Advantageously, a split flag is decoded for the current octant indicating if its immediate children are recursively decoded or if all the residues of the vertices of all its children not yet decoded are inferred to be zero.

An encoder for encoding a LUT defined as a lattice of vertices, wherein at least one value is associated with each vertex of the lattice comprising for a current vertex:
means for predicting the at least one value associated with a current vertex from another value; and
means for encoding in a bitstream at least one residue computed between the at least one value of the current vertex and its prediction in a bitstream.

Advantageously, the another value is obtained from reconstructed values associated with neighboring vertices. The encoder is configured to execute the steps of the method for encoding.

A decoder for decoding a LUT defined as a lattice of vertices, wherein at least one value is associated with each vertex of the lattice comprising:
means for decoding at least one residue associated with a current vertex from a bitstream;
means for predicting the at least one value associated with the current vertex from another value; and
means for reconstructing the at least value of the current vertex from its prediction and the decoded at least one residue.

Advantageously, the another value is obtained from reconstructed values associated with neighboring vertices.

The encoder is configured to execute the steps of the method for decoding.

A bitstream encoding at least a LUT defined as a lattice of vertices is disclosed. At least one value is associated with each vertex of the lattice and the bitstream comprises encoded in it at least one residue computed between the at least one value of a current vertex and its prediction.

BRIEF DESCRIPTION OF THE DRAWINGS

Other features and advantages of the invention will appear with the following description of some of its embodiments, this description being made in connection with the drawings in which:

FIG. 1 illustrates an architecture of a scalable video decoder that uses gamut scalability according to the prior art;

FIG. 2 illustrates an architecture of a video decoder that comprises color transform to adapt to rendering display characteristics according to the prior art;

FIG. 3 diagrammatically shows a square 3D LUT represented as a lattice of N×N×N vertices according to the prior art;

DETAILED DESCRIPTION OF THE INVENTION

Figure 4:
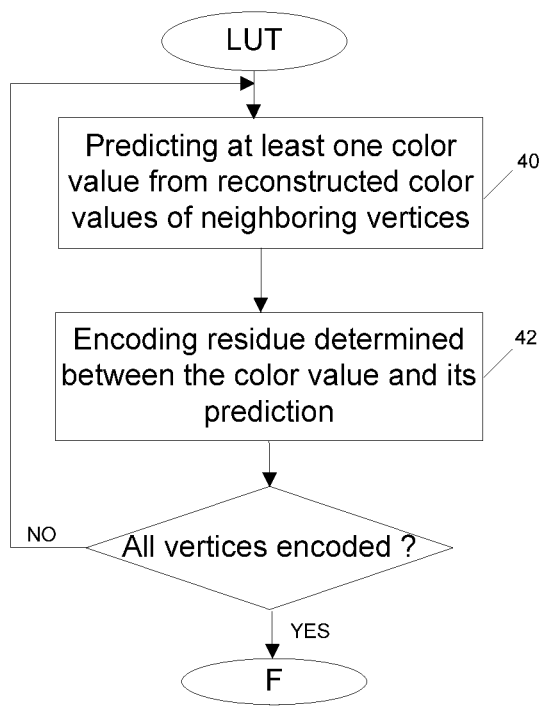
FIG. 4 depicts a flowchart of an encoding method according to an exemplary embodiment of the invention.

FIG. 4 represents a flowchart of an encoding method according to an exemplary embodiment of the invention. The method is for encoding a LUT defined as a lattice of vertices, wherein at least one value, e.g. a color value, is associated with each vertex of the lattice. In reference to the decoding, the terms "reconstruction" and "decoding" are very often used as synonyms. In the following, the term color value comprises color values of a given color space such as RGB, YUV or Y,Cb,Cr values and further comprises values representative of a color transform such as CMF parameters, i.e. matrix parameters and offset values.

In a step 40, the at least one color value of a current vertex is predicted from reconstructed color values associated with neighboring vertices.

Figure 5:
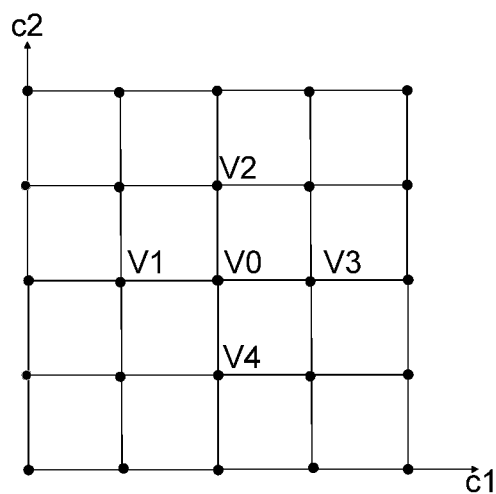
FIG. 5 diagrammatically shows a 2D LUT.

As an example, a 2D LUT associating with a vertex $V0(c1_0, c2_0)$ a corresponding pair of values $(V0_{c1}, V0_{c2})$, e.g. color values, is depicted on FIG. 5. The values associated with the vertex V0 are predicted for example from spatially neighboring vertices $V1(c1_1, c2_1)$, $V2(c1_2, c2_2)$, $V3(c1_3, c2_3)$ and $V4(c1_4, c2_4)$ with corresponding pair of values $(Vi_{c1}, Vi_{c2})_{i=1, \ldots, 4}$. A prediction P(Pc1, Pc2) is for example computed using interpolation as follows:

$$Pc1 = 0.25 * (V1_{c1} + V2_{c1} + V3_{c1} + V4_{c1})$$

$$Pc2 = 0.25 * (V1_{c2} + V2_{c2} + V3_{c2} + V4_{c2})$$

According to a variant, the 2D LUT associates with the vertex $V0(c1_0, c2_0)$ a set of parameters (m11, m12, m21, m22, o1, o2) instead of the pair of values $(V0_{c1}, V0_{c2})$. This set of parameters can be used to reconstruct the values $(V0_{c1}, V0_{c2})$ from the values $(c1_0, c2_0)$ of V0 as follows:

$$V0_{c1} = m11 * c1_0 + m12 * c2_0 + o1$$

$$V0_{c2} = m21 * c1_0 + m22 * c2_0 + o2$$

The parameters associated with the vertex V0 are predicted for example from reconstructed parameters associated with spatially neighboring vertices $V1(c1_1, c2_1)$, $V2(c1_2, c2_2)$, $V3(c1_3, c2_3)$ and $V4(c1_4, c2_4)$. A prediction is for example computed for a parameter of the current vertex using interpolation.

In a step 42, at least one residue is determined between the at least one color value of the current vertex and its prediction and is further encoded in a bitstream F. The residue is determined by subtracting from the at least one color value of the current vertex its prediction. The encoding usually comprises entropy encoding. According to a variant the encoding comprises quantizing the residue with a quantizer q and entropy encoding the quantized residue. As an example, in the case of the 2D LUT, first and second residues are computed for the vertex V0. The first residue is equal to $(V0_{c1} - Pc1)$ and the second residue is equal to $(V0_{c2} - Pc2)$. The residues or the quantized residues $(V0_{c1} - Pc1)/q$ and $(V0_{c2} - Pc2)/q$ are then entropy coded in the bitstream F. The entropy coding makes use of traditional binary coding techniques such as Exponential-Golomb, Huffman, CABAC (English acronym of "Context Adaptive Binary Arithmetic Coding").

The steps 40 and 42 are iterated to encode a further vertex of the LUT until all the vertices of the LUT are encoded.

Optionally, the encoding method comprises encoding in the bitstream F the quantizer value q. The at least one color value of the current vertex is further reconstructed to be used for the prediction of other vertices. Each reconstructed at least one color value is equal to the corresponding original color value if no quantizer is used, i.e. q=1. Otherwise, the at least one reconstructed color value is determined by dequantizing the residue and adding the dequantized residue to the prediction.

According to a variant, the encoding method further comprises encoding in the bitstream F the interpolation type used for predicting the at least one color value of the vertex. More precisely an index is decoded from the bitstream that identify an interpolation type. As an example, the index 0 identifies the bilinear interpolation, an index 1 identifies nearest neighbor interpolation, an index 2 identifies linear interpolation with 2 nearest neighbors.

According to a variant, not all the vertices of the LUT are encoded in the bitstream F. For example if the absolute value of all residues or of all the quantized residues of a vertex are below a threshold value TH then no residue is encoded for that vertex, e.g. TH=0 or TH=1. A binary flag is thus encoded in the bitstream for each vertex indicating if at least one residue is encoded for that vertex or if none of the residues are encoded and are thus inferred to be zero.

According to a variant, a binary flag is encoded for each color value of each vertex indicating if a residue is encoded for that color value or if the residue is not encoded and is inferred to be zero.

The size of the LUT is also optionally encoded in the bitstream.

Figure 6:
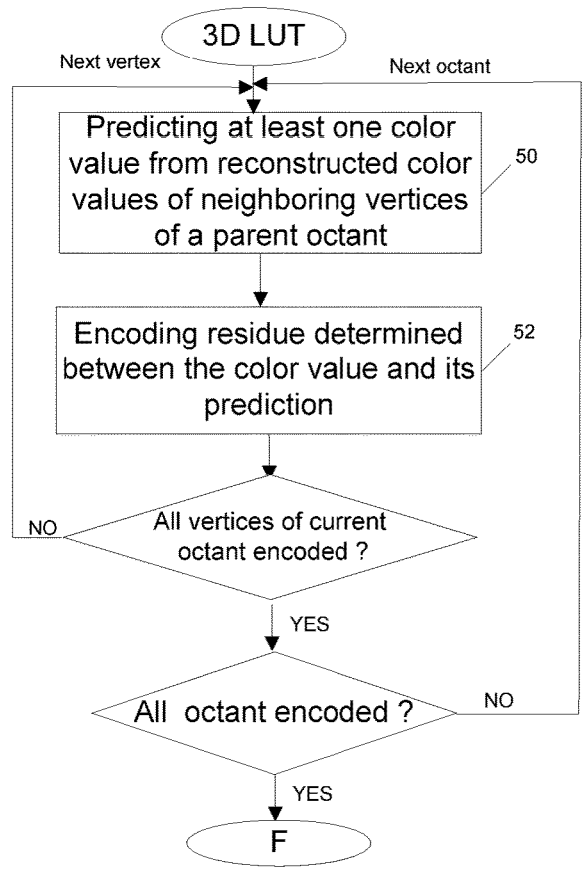
FIG. 6 represents a flowchart of an encoding method according to another exemplary embodiment of the invention.
Figure 7A:
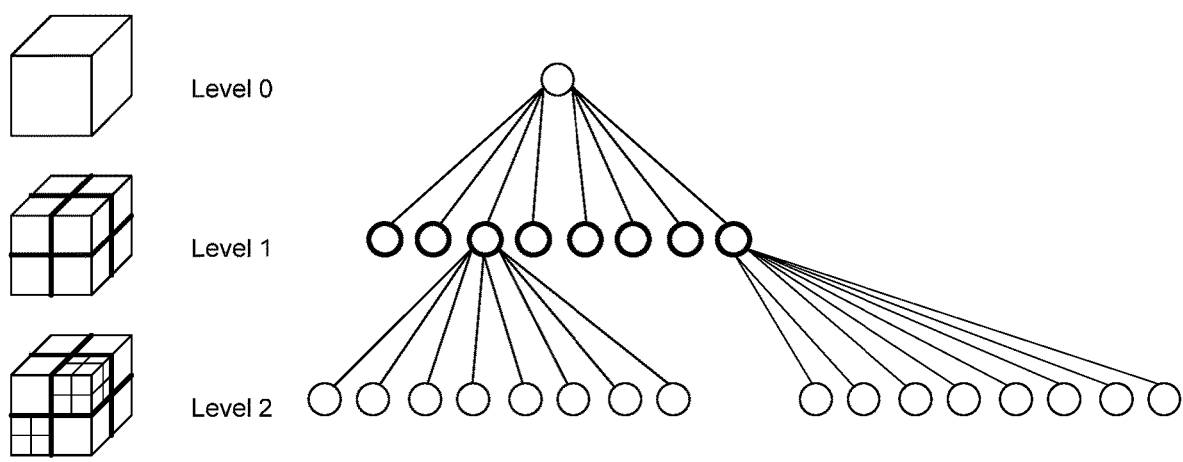
FIGS. 7A and 7B diagrammatically shows on the left a recursive subdivision of a cube into octants and on the right a corresponding octree.
Figure 7B:
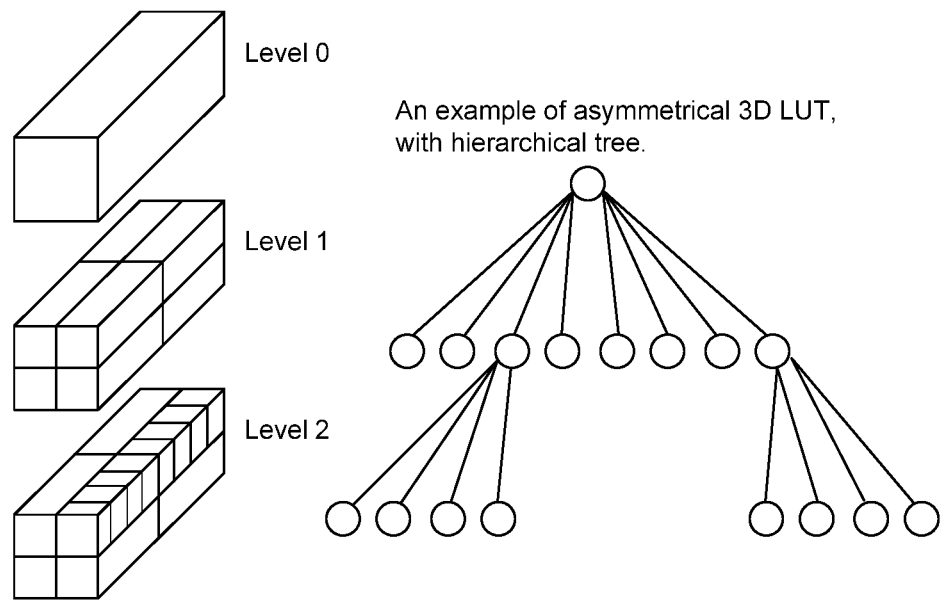

FIG. 6 represents a flowchart of an encoding method according to another exemplary embodiment of the invention. The method is for encoding a 3D LUT defined as a lattice of vertices using an octree, wherein a set of n color values such as a triplet of color values is associated with each vertex of the lattice, where n is an integer ≥1. An octree is for partitioning a 3D color space by recursively subdividing it into eight octants as depicted on FIGS. 7A and 7B. On FIG. 7A the partitioning is symmetric while on FIG. 7B the partitioning is asymmetric. An Octant of level N has its parent octant in level N−1. Octrees are the 3D analog of quadtrees. The encoding method is disclosed for the encoding of a current vertex V of the lattice that belongs to a current octant. In the following n=3.

In a step 50, each of the three color values $(V_r, V_g, V_b)$ associated with the current vertex V of coordinates (r, g, b) is predicted from reconstructed color values associated with neighboring vertices, i.e. vertices which belong to a parent octant of the current octant. (r, g, b) is used instead of (c1, c2, c3) for simplifying the notations. But the invention is not limited to the (R, G, B) color space. It can be applied to (Y,U,V), (Y,Cb,Cr), . . . color spaces representations.

Figure 8:
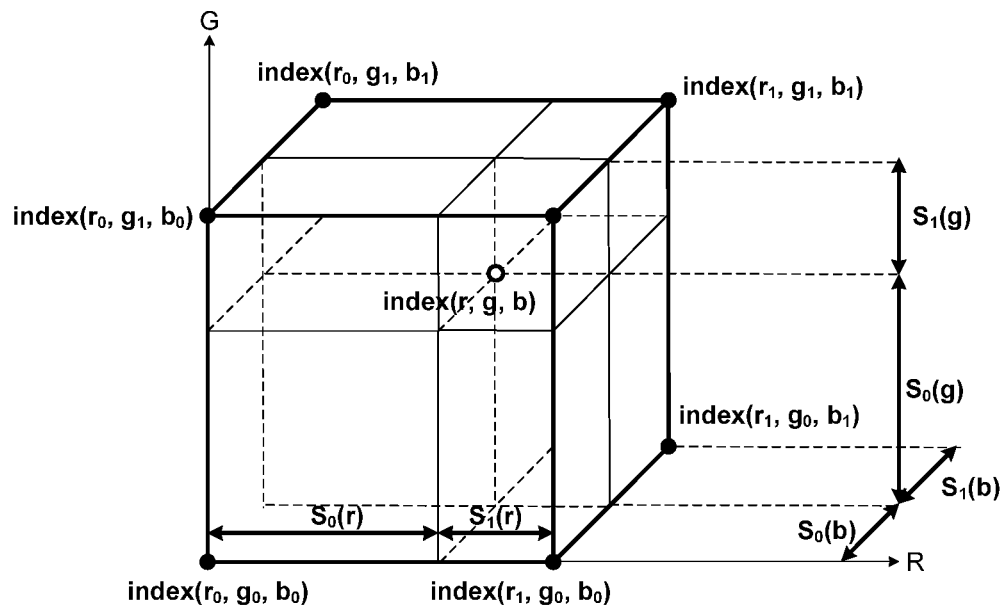
FIG. 8 illustrates an interpolation of the color values of a vertex according to the invention.

A prediction is thus determined for each color value using for example a trilinear interpolation as illustrated by FIG. 8:

$$\overline{V}_r = K \times \Sigma_{i=0,1} \Sigma_{j=0,1} \Sigma_{k=0,1} s_i(r) \times s_j(g) \times s_k(b) \times LUT[r_i][g_j][b_k], r$$

where: (ri, gj, bk) with i=0, 1, j=0, 1 and k=0, 1 are the coordinates of the vertices of the parent octant in the 3D color space;

(r, g, b) are the coordinates of the current vertex;

$LUT[r_i][g_j][b_k]$. r is the first color value associated with the vertex (ri, gj, bk);

$$K = \frac{1}{(r_1 - r_0) \times (g_1 - g_0) \times (b_1 - b_0)}$$

$s_0(t) = t_1 - t$, and $s_1(t) = t - t_0$ with t=r, g or b.

The same equations are used for g and b. Other type of interpolation can be used such as prism, pyramidal or tetrahedral.

Figure 9A:
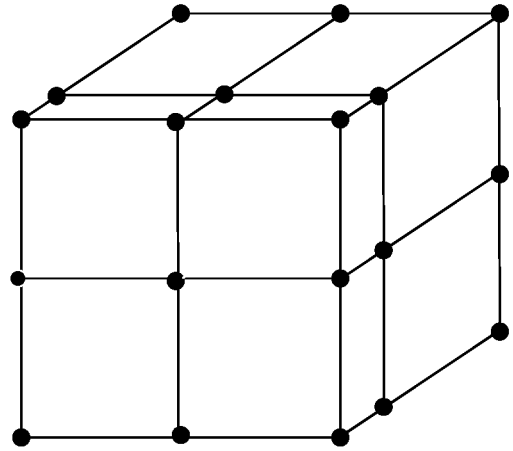
FIG. 9A diagrammatically shows a 3D LUT represented as a non-uniform lattice.

The lattice is not necessarily uniform as depicted on FIG. 9A.

Figure 9B:
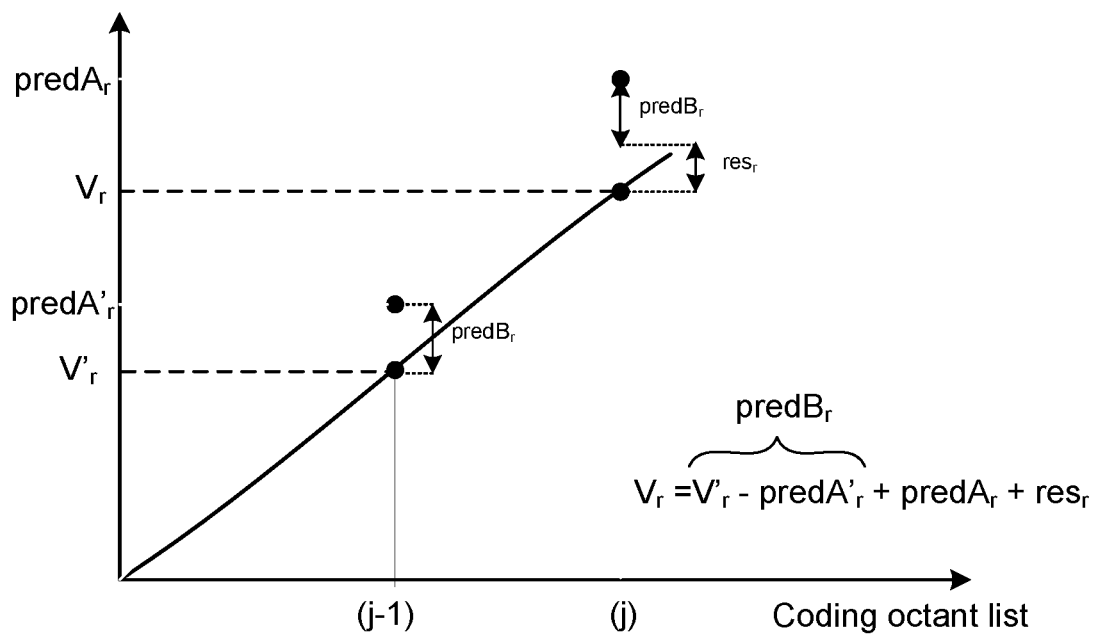
FIG. 9B illustrates the prediction of a value associated with a vertex according specific and non limitative embodiment.

In a variant of step 50, each of the three color values $(V_r, V_g, V_b)$ associated with the current vertex V of coordinates (r, g, b) of a current octant of index j is predicted from at least one reconstructed color value associated with one neighboring vertex Vp of coordinates $(r_p, g_p, b_p)$, i.e. a vertex which belongs to a neighboring octant of index (j−1). A neighboring octant is an octant sharing at least one vertex with the current octant and/or preceding the current octant in the coding octant list. A coding octant list is a list specifying the order of coding of the octant. In a specific embodiment all the octants belong to one and the same level. A prediction is thus determined for each color value as illustrated by FIG. 9B for component r: $\nabla_r \text{PredA}_r + \text{PredB}_r$, where $\text{PredA}_r$ is a value that depends on the position of the vertex in the 3D LUT and $\text{PredB}_r$ is a value that depends on the reconstructed color value associated with the neighboring vertex Vp. $\text{PredA}_r$ is for example equal to $r_p$. Exemplarily, $\text{PredB}_r = \text{V'r} - \text{PredA'}_r$, where V'r is the reconstructed color value of the vertex Vp of a neighboring octant and $\text{PredA'}_r$ is a value that depends on the position of the vertex Vp in the 3D LUT. $\text{PredA'}_r$ is for example equal to $r_p$. The same equations are used for g and b.

In a step 52, three residues are computed for the current vertex, one for each color components: $\text{res}_r = (V_r - \nabla_r)$, $\text{res}_g = (V_g - \nabla_g)$ and $\text{res}_b = (V_b - \nabla_b)$.

The residues are then entropy coded in a bitstream or quantized before being entropy coded. The entropy coding makes use of traditional binary coding techniques such as Exponential-Golomb, Huffman, CABAC (English acronym of "Context Adaptive Binary Arithmetic Coding").

The octant of level 0 has not parent octant. In the same way, the first octant in the coding octant list has no preceding octant. Consequently, each of the three color values $(V_r, V_g, V_b)$ associated with a current vertex V of this octant is predicted from a known color value, e.g. the value 128. According to a variant, different known values are used for the different vertices of the octant of level 0. According to another variant, predicting from known color values is also made for other octants than the octant of level 0. According to a variant, each of the three color values $(V_r, V_g, V_b)$ associated with a current vertex V of this octant is predicted from already reconstructed color values associated with neighboring vertices which belong to the same octant.

Optionally, the encoding method comprises encoding in the bitstream the quantizer value q. The three color values of the current vertex are further reconstructed and can be used for the prediction of other vertices. Each reconstructed color values is equal to the original color value if no quantizer is used (q=1). Otherwise, each reconstructed color value is determined by dequantizing the corresponding residue and adding the dequantized residue to the corresponding prediction.

According to a variant, the encoding method further comprises encoding in the bitstream the interpolation type used for predicting the at least one color value of the vertex. More precisely an index is encoded in the bitstream that identifies an interpolation type. As an example, the index 0 identifies the trilinear interpolation, the index 1 identifies a prism interpolation, the index 2 identifies a pyramidal interpolation and the index 3 identifies a tetrahedral interpolation.

Figure 9C:
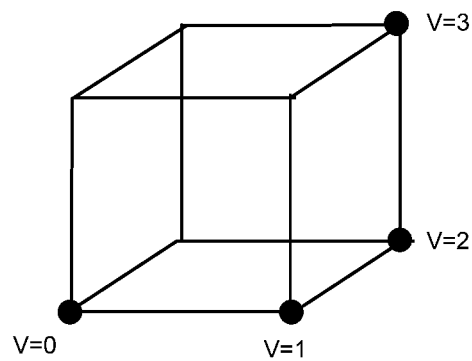
FIG. 9C represents an octant in which only 4 out of 8 vertices are encoded.

According to a variant, not all the vertices of the LUT are encoded in the bitstream. For example, if the absolute values of all the residues or of all the quantized residues of a vertex are below a threshold value TH then no residue is encoded for that vertex, e.g. TH=0 or TH=1. A binary flag is thus encoded in the bitstream for each vertex indicating whether or not at least one residue is encoded for that vertex. According to a variant, a binary flag is encoded for each color value of each vertex indicating if a residue is encoded for that color value or if the residue is not encoded and is inferred to be zero. In another variant, only specific vertices are encoded as depicted on FIG. 9C. On this figure only 4 out of 8 vertices are encoded per octant.

The LUT is usually encoded in a bitstream for being used to transform pictures of a video in applications such as rendering display color adaptation or color gamut scalability. The LUT may be encoded and transmitted with the video. If the encoding method knows that some parts of the 3D LUT is not to be used by the application, then the vertices that belong to this part of the 3D LUT are not encoded. In the same way, if the encoding method knows that some parts of the 3D LUT have small impacts on the final rendering of the video, then the vertices that belong to this part of the 3D LUT are not encoded.

The method is applied recursively for encoding the whole 3D LUT. In this case, all the octants of the octree are encoded. Once all the vertices of a current octant are encoded, the vertices of the children octant of the current octant are encoded.

In a variant, the 3D LUT is pre-processed before being encoded. In this case, a split flag is associated with each octant in the octree and is initially set to false. During the pre-processing step, the split flag values are determined for each octant. If at least one vertex to be encoded of a current octant has at least one residue possibly quantized greater than TH, then the split flag of its parent octant is set to "true". The split flag of a current octant of level N thus indicates if its immediate children (i.e. children of level N+1) are recursively encoded or if all the residues of the vertices of all its children (i.e. children of level N+k with k>0) not yet encoded are inferred to be zero.

Figure 9D:
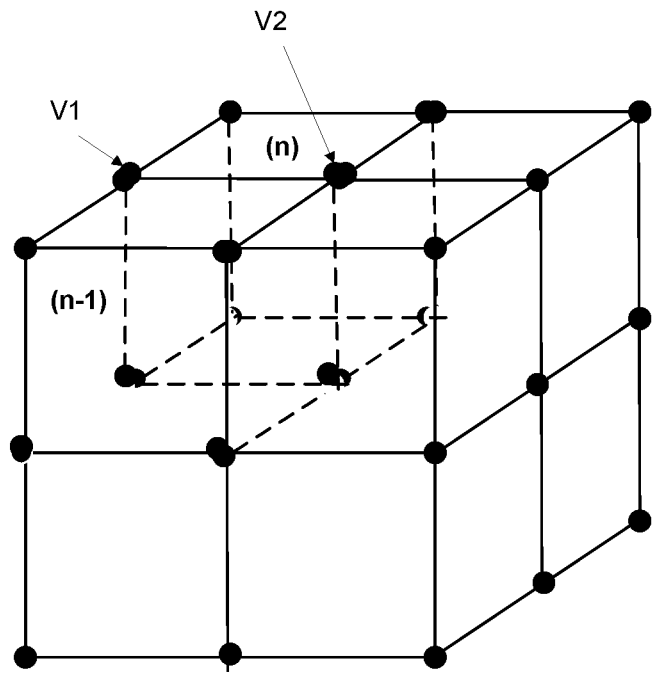
FIG. 9D represents octants sharing vertices.

During the encoding step, the split flags and the residues are encoded in the bitstream. Once all the vertices of a current octant are encoded, the vertices of the children octant of the current octant are encoded if current octant split flag is true. The vertices that belong to two octants are preferentially encoded only once. In a variant, the vertices shared between several octants are encoded more than once. Specifically, the vertices are encoded several times with different values, one value for each octant it belongs to. With reference to FIG. 9D, the vertex V1 is shared between the octant (j) and the octant (j−1). Therefore, V1 can be encoded twice with one value for the octant (j) and another value for the octant (j−1). The first value and the another value may be different. In the same way, the vertex V2 that is shared between 4 octants can be encoded 4 times.

The 3D LUT is for example encoded in the VPS ("Video Parameter Set"), SPS ("Sequence Parameter Set"), PPS ("Picture Parameter Set") or in one SEI message ("Supplemental Enhancement Information") as defined in AVC, HEVC, SVC or SHVC video coding standards. The 3D LUT is for example encoded in a SEI message such as the one defined below. The size S of the LUT is also optionally encoded in the bitstream. S is the number of vertices in one direction. According to a variant, n 3D LUTs composed of vertices with 1 color value are encoded instead of encoding one 3D LUT composed of vertices with n associated color values, e.g. n=3, as disclosed above.

According to a variant, when the 3D LUT size is S=2, a flag is encoded indicating to the decoder to compute a 3×3 gain matrix plus an offset from the decoded 3D LUT and to use it as CMF instead of the 3D LUT.

According to another variant, one 3D LUT composed of vertices with n associated color values is used to encode parameters of a color transform defined locally. Exemplarily, each vertex of the 3D LUT is associated with 12 color values representative of a color transform. Instead of associating the 3 color values $(V_r, V_g, V_b)$ with the current vertex V, 12 color values representative of a color transform are associated with the vertex V(r,g,b), wherein the 12 color values [ai, bi,ci, oi] with i=0, 1 or 2 are defined so that the following equation is verified:

$$\begin{pmatrix} Vr \\ Vg \\ Vb \end{pmatrix} = \begin{pmatrix} a_0 & b_0 & c_0 \\ a_1 & b_1 & c_1 \\ a_2 & b_2 & c_2 \end{pmatrix} \begin{pmatrix} r \\ g \\ b \end{pmatrix} + \begin{pmatrix} o_0 \\ o_1 \\ o_2 \end{pmatrix}$$

According to a variant, only the parameters [ai, bi,ci] with i=0, 1 or 2 are associated with the vertices.

Indeed, in the case of a 3D LUT of size 2 (one single octant with 8 vertices), one can choose the three color values of the vertices so that the 3D LUT is equivalent to the Gain-Offset model defined by the following equation:

$$\begin{pmatrix} y' \\ u' \\ v' \end{pmatrix} = \begin{pmatrix} a_0 & b_0 & c_0 \\ a_1 & b_1 & c_1 \\ a_2 & b_2 & c_2 \end{pmatrix} \begin{pmatrix} y \\ u \\ v \end{pmatrix} + \begin{pmatrix} o_0 \\ o_1 \\ o_2 \end{pmatrix}$$

To do so, one has to set the 3 color values $(y_X, u_X, v_X)_{X=A,\ldots H}$ of the 8 vertices A to H to the following values:

$$\begin{cases} y_A = 255 \cdot a_0 \\ y_B = 255 \cdot a_0 + o_0 \\ y_C = 255 \cdot b_0 + o_0 \\ y_D = 255 \cdot (a_0 + b_0) + o_0 \\ y_E = 255 \cdot c_0 + o_0 \\ y_F = 255 \cdot (a_0 + c_0) + o_0 \\ y_G = 255 \cdot (b_0 + c_0) + o_0 \\ y_H = 255 \cdot (a_0 + b_0 + c_0) + o_0 \end{cases} \quad \begin{cases} u_A = 255 \cdot a_1 \\ u_B = 255 \cdot a_1 + o_1 \\ u_C = 255 \cdot b_1 + o_1 \\ u_D = 255 \cdot (a_1 + b_1) + o_1 \\ u_E = 255 \cdot c_1 + o_1 \\ u_F = 255 \cdot (a_1 + c_1) + o_1 \\ u_G = 255 \cdot (b_1 + c_1) + o_1 \\ u_H = 255 \cdot (a_1 + b_1 + c_1) + o_1 \end{cases}$$

$$\begin{cases} v_A = 255 \cdot a_2 \\ v_B = 255 \cdot a_2 + o_2 \\ v_C = 255 \cdot b_2 + o_2 \\ v_D = 255 \cdot (a_2 + b_2) + o_2 \\ v_E = 255 \cdot c_2 + o_2 \\ v_F = 255 \cdot (a_2 + c_2) + o_2 \\ v_G = 255 \cdot (b_2 + c_2) + o_2 \\ v_H = 255 \cdot (a_2 + b_2 + c_2) + o_2 \end{cases}$$

K is a constant that depends on the number of bits used to represent each color value. K=255 if the color values are represented on 8 bits, K=1023 if the color values are represented on 10 bits, etc. Then, the tri-linear interpolation is equivalent to the Gain-Offset model.

Figure 10:
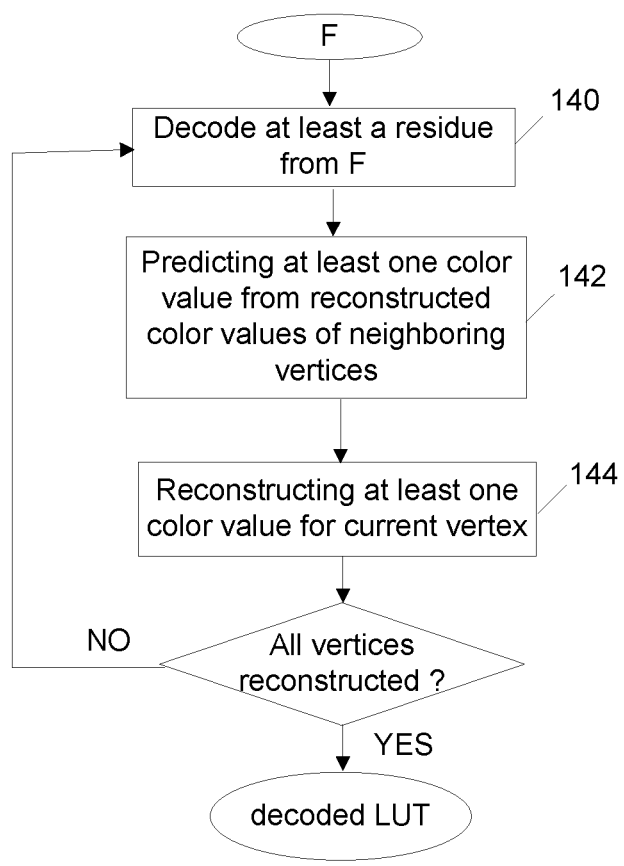
FIG. 10 represents a flowchart of a decoding method according to an exemplary embodiment of the invention.

FIG. 10 represents a flowchart of a decoding method according to an exemplary embodiment of the invention.

In a step 140, at least one residue is decoded from a bitstream F. The decoding usually comprises entropy decoding. According to a variant the decoding comprises entropy decoding of a quantized residue and inverse quantizing of the quantized residue with a quantizer q. The entropy decoding makes use of traditional binary decoding techniques such as Exponential-Golomb, Huffman, CABAC (English acronym of "Context Adaptive Binary Arithmetic Coding"). Optionally, the decoding method comprises decoding from the bitstream F the quantizer value q.

According to a variant, not all the vertices of the LUT are encoded in the bitstream F. Optionally, a binary flag is decoded from the bitstream for each vertex indicating whether or not at least one residue is encoded for that vertex. If no residue is encoded, the residue(s) is/are assumed to be zero for this vertex.

In a step 142, the at least one color value of a current vertex is predicted from reconstructed color values associated with neighboring vertices. As an example of a 2D LUT associating with a vertex V0(c1,c2) a corresponding pair of color values (V0$_{c1}$, V0$_{c2}$) is depicted on FIG. 5. The color values associated with vertex V0 are predicted from spatially neighboring vertices V1, V2, V3 and V4. As an example, a predictor P(Pc1, Pc2) is computed using interpolation as follows:

$Pc1 = 0.25 * (V1_{c1} + V2_{c1} + V3_{c1} + V4_{c1})$ $Pc2 = 0.25 * (V1_{c2} + V2_{c2} + V3_{c2} + V4_{c2})$

According to a variant, the 2D LUT associates with the vertex V0(c1$_0$,c2$_0$) a set of parameters (m11, m12, m21, m22, o1, o2) instead of the pair of values (V0$_{c1}$, V0$_{c2}$). This set of parameters can be used to reconstruct the values (V0$_{c1}$, V0$_{c2}$) from the values (c1$_0$,c2$_0$) of V0 as follows:

$V0_{c1} = m11 * c1_0 + m12 * c2_0 + o1$ $V0_{c2} = m21 * c1_0 + m22 * c2_0 + o2$

The parameters associated with the vertex V0 are predicted for example from reconstructed parameters associated with spatially neighboring vertices V1(c1$_1$,c2$_1$), V2(c1$_2$,c2$_2$), V3(c1$_3$,c2$_3$) and V4(c1$_4$,c2$_4$). A prediction is for example computed for a parameter of the current vertex using interpolation.

In a step 144, a vertex is reconstructed. More precisely, at least one color value of the current vertex is reconstructed from its prediction and the decoded at least one residue.

As an example, in the case of the 2D LUT, two residues R$_{c1}$ and R$_{c2}$ are decoded for the current vertex V0. The current vertex is thus reconstructed by computing its two color values as follows: (R$_{c1}$+Pc1) and (R$_{c2}$+Pc2).

According to a variant, the decoding method further comprises decoding from the bitstream F the interpolation type used for predicting the at least one color value of the vertex. More precisely an index is decoded from the bitstream that identify an interpolation type. As an example, the index 0 identifies the bilinear interpolation and an index 1 identifies a nearest vertices value interpolation.

The size of the LUT is also optionally decoded from the bitstream.

Figure 11:
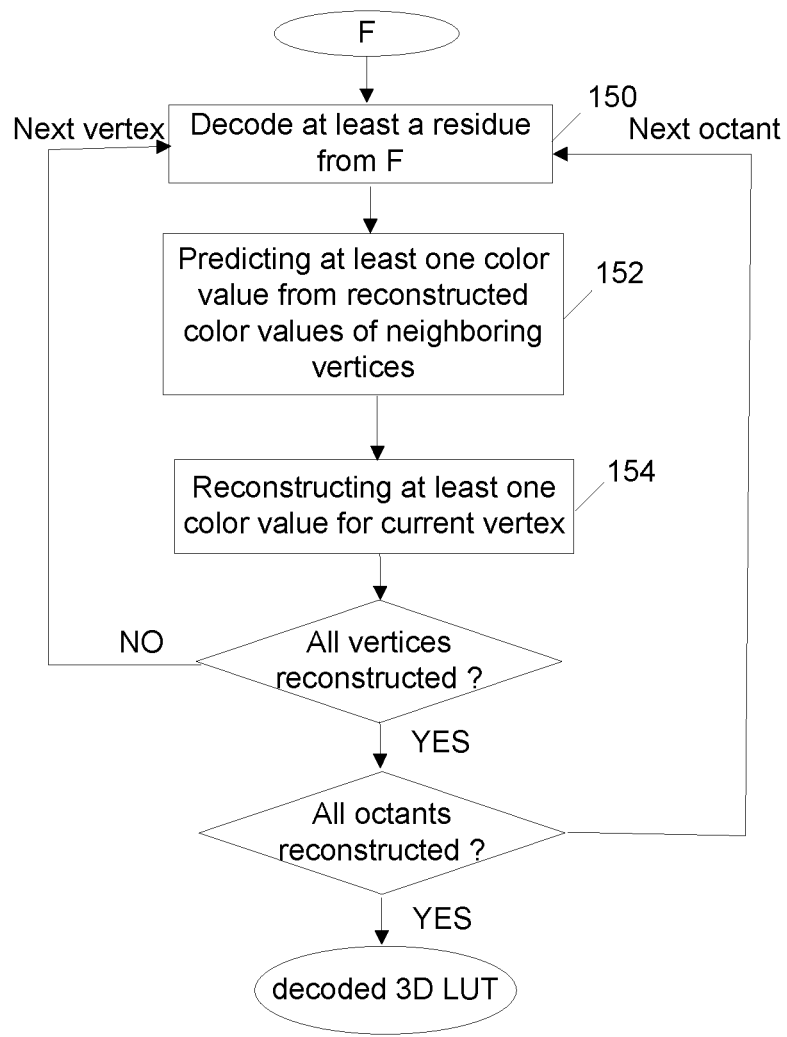
FIG. 11 represents a flowchart of a decoding method according to another exemplary embodiment of the invention.

FIG. 11 represents a flowchart of a decoding method according to another exemplary embodiment of the invention. The method is for decoding a 3D LUT defined as a lattice of vertices using an octree, wherein a triplet of color values is associated with each vertex of the lattice. The decoding method is disclosed for the decoding a current vertex V of the lattice that belongs to a current octant.

In a step 150, three residues res$_r$, res$_g$, res$_b$ are decoded from a bitstream F. The decoding usually comprises entropy decoding. According to a variant the decoding comprises entropy decoding of a quantized residue and inverse quantizing of the quantized residue with a quantizer q. The entropy decoding makes use of traditional binary decoding techniques such as Exponential-Golomb, Huffman, CABAC (English acronym of "Context Adaptive Binary Arithmetic Coding").

Optionally, the decoding method comprises decoding from the bitstream F the quantizer value q.

According to a variant, not all the vertices of the LUT are encoded in the bitstream F. Optionally, a binary flag is decoded from the bitstream for each vertex indicating whether or not at least one residue is encoded for that vertex. If no residue is encoded, the residue(s) is/are assumed to be zero for this vertex. In another variant, only specific vertices are decoded as depicted on FIG. 9C. On this figure only 4 out of 8 vertices are decoded per octant.

In a step 152, each of the three color values ($V_r$, $V_g$, $V_b$) associated with the current vertex V of coordinates (r, g, b) is predicted from reconstructed color values associated with neighboring vertices, i.e. vertices which belong to a parent octant of the current octant. (r, g, b) is used instead of (c1, c2, c3) for simplifying the notations. But the invention is not limited to the (R, G, B) color space. It can be applied to (Y,U,V), (Y,Cb,Cr), . . . color spaces representations.

A prediction is thus determined for each color value.

A prediction is thus determined for each color value using for example a trilinear interpolation as illustrated by FIG. 8:

$$\overline{V}_r = K \times \Sigma_{i=0,1} \Sigma_{j=0,1} \Sigma_{k=0,1} s_i(r) \times s_j(g) \times s_k(b) \times LUT[r_i][g_j][b_k].r$$

where: (ri, gj, bk) with i=0, 1, j=0, 1 and k=0, 1 are the coordinates of the vertices of the parent octant in the 3D color space;

(r, g, b) are the coordinates of the current vertex;

$LUT[r_i][g_j][b_k]$. r is the first color value associated with the vertex (ri, gj, bk);

$$K = \frac{1}{(r_1 - r_0) \times (g_1 - g_0) \times (b_1 - b_0)}$$

$s_0(t) = t_1 - t$, and $s_1(t) = t - t_0$ with t=r, g or b.

The same equations are used for g and b. Other type of interpolation can be used such as prism, pyramidal or tetrahedral. The lattice is not necessarily uniform as depicted on FIG. 9A.

In a variant of step 152, each of the three color values ($V_r$, $V_g$, $V_b$) associated with the current vertex V of coordinates (r, g, b) of a current octant of index j is predicted from at least one reconstructed color value associated with one neighboring vertex Vp of coordinates ($r_p$, $g_p$, $b_p$), i.e. a vertex which belongs to a neighboring octant of index (j−1). A neighboring octant is an octant sharing at least one vertex with the current octant and/or preceding the current octant in the coding octant list. A coding octant list is a list specifying the order of coding of the octant. In a specific embodiment all the octants belong to one and the same level. A prediction is thus determined for each color value as illustrated by FIG. 9B for component r: $\overline{V}_r = PredA_r + PredB_r$, where $PredA_r$ is a value that depends on the position of the vertex in the 3D LUT and $PredB_r$ is a value that depends on the reconstructed color value associated with the neighboring vertex Vp. $PredA_r$ is for example equal to $r_p$. Exemplarily, $PredB_r = V'r - PredA'_r$, where V'r is the reconstructed color value of the vertex Vp of a neighboring octant and $PredA'_r$ is a value that depends on the position of the vertex Vp in the 3D LUT. $PredA'_r$ is for example equal to $r_p$. The same equations are used for g and b.

In a step 154, three color values are computed thus reconstructed for the current vertex from their prediction and the corresponding decoded residues ($res_r$, $res_g$, $res_b$). The current vertex is thus reconstructed by computing its three color values as follows: ($res_r + \overline{V}_r$), ($res_g + \overline{V}_g$)) and ($res_b + \overline{V}_b$).

The octant of level 0 has not parent octant. In the same way, the first octant in the coding octant list has no preceding octant. Consequently, each of the three color values ($V_r$, $V_g$, $V_b$) associated with a current vertex V of this octant is predicted from a known color value, e.g. the value 128. According to a variant, each of the three color values ($V_r$, $V_g$, $V_b$) associated with a current vertex V of this octant is predicted from already reconstructed color values associated with neighboring vertices which belong to the same octant.

The method is applied recursively for decoding the whole 3D LUT. The vertices that belong to two octants are preferentially decoded only once. In a variant, the vertices shared between several octants are decoded more than once.

Specifically, the vertices are decoded several times with different values, one value for each octant it belongs to. With reference to FIG. 9D, the vertex V1 is shared between the octant (j) and the octant (j−1). Therefore, V1 can be decoded twice with one value for the octant (j) and another value for the octant (j−1). The first value and the another value may be different. In the same way, the vertex V2 that is shared between 4 octants can be decoded 4 times.

Once all the vertices of a current octant (level N) are decoded, the vertices of the children (level N+1) octants of the current octant are decoded.

According to a variant, a split flag is decoded for a current octant of level N that indicates if its immediate children (i.e. children of level N+1) are recursively decoded or if all the residues of the vertices of all the children (i.e. children of level N+k with k>0) not yet decoded are inferred to be zero.

According to a variant, the decoding method further comprises decoding from the bitstream F the interpolation type used for predicting the at least one color value of the vertex. More precisely an index is decoded from the bitstream that identify an interpolation type. As an example, the index 0 identifies the trilinear interpolation, the index 1 identifies a prism interpolation, the index 2 identifies a pyramid interpolation and the index 3 identifies a tetrahedral interpolation.

The 3D LUT is for example decoded from the VPS, SPS, PPS or in one SEI message as defined in AVC, HEVC, SVC or SHVC video coding standards. The size of the LUT is also optionally decoded from the bitstream. The 3D LUT is for example decoded in a SEI message such as the one defined below.

According to a variant, n 3D LUTs composed of vertices with 1 color value are decoded instead of decoding one 3D LUT composed of vertices with n color values, e.g. n=3.

According to a variant, when the 3D LUT size is S=2, a flag is decoded indicating to the decoder to compute a 3×3 gain matrix plus an offset from the decoded 3D LUT and to use it as CMF instead of the 3D LUT.

The same variants disclosed with respect to the encoding method according to FIGS. 4 and 6 can be applied on the decoder side.

In the FIGS. 4, 6, 10 and 11, the represented boxes are purely functional entities, which do not necessarily correspond to physical separated entities. As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware_aspects that can all generally be referred to herein as a "circuit," "module", or "system." Furthermore, aspects of the present principles can take the form of a computer readable storage medium. Any combination of one or more computer readable storage medium(s) may be utilized.

The flowchart and/or block diagrams in the figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

A bitstream is also disclosed that encodes a LUT such as a 3D LUT. The bitstream produced by the encoding method of figure encoding at least a LUT defined as a lattice of vertices, wherein at least one color value is associated with each vertex of the lattice, wherein said bitstream comprises encoded in it at least one residue computed between the at least one color value of a current vertex and its prediction.

An exemplary embodiment is proposed within the framework of the HEVC coding standard defined in document JCTVC-L1003 of Joint Collaborative Team on Video Coding (JCT-VC) of ITU-T SG16 WP3 and ISO/IEC JTC1/SC29/WG11 or the SHVC coding standard which is the scalable extension of the HEVC coding standard defined in document JCTVC-L1008 of Joint Collaborative Team on Video Coding (JCT-VC) of ITU-T SG16 WP3 and ISO/IEC JTC1/SC29/WG11. The standard defines a syntax that any stream of coded data must comply with to be compatible with this standard. The syntax defines in particular how the various items of information are coded (for example the data relating to the pictures included in the sequence, the motion vectors, etc). In the context of SHVC coding standard, the LUT can be encoded into the PPS or the VPS. The syntax element, use_color_prediction, is used to indicate the use of color prediction in the current picture as shown in Table 1.

TABLE 1

| signaling of the prediction parameters |
| --- |
| use_color_prediction |
| if(use_color_prediction) |
| 3D_LUT_color_data ( ) |
| rbsp_trailing_bits( ) |

If the use_color_prediction flag is equal to '1', the 3D_LUT_color data function is called to signal 3D LUT data as shown in Table 2.

TABLE 2

| coding of the 3D LUT color data | |
| --- | --- |
| | Descriptor |
| 3D_LUT_color_data ( ) { | |
| nbpCode | u(3) |
| coding_octant(0, 0,0,0) | |
| } | | nbpCode indicates the 3D LUT size as listed in Table 4 for the given value of nbpCode. The quantizer value can be encoded by the 3D_LUT_color_data( ) function.

According to a variant, 3D_LUT_color_data ( ) is defined as follows in table 3.

TABLE 3

| coding of the 3D LUT color data | |
| --- | --- |
| | Descriptor |
| 3D_LUT_color_data ( ) { | |
| nbpCode | u(3) |
| NbitsPerSample | u(5) |
| coding_octant(0, 0,0,0) | |
| } | | nbpCode indicates the 3D LUT size as listed in Table 4 for the given value of nbpCode. The quantizer value can be encoded by the 3D_LUT_color_data( ) function.

NbitsPerSample indicates a number of bits used to represent the color values.

TABLE 4

| Interpretation of nbpCode | |
| --- | --- |
| nbpCode | 3D LUT size |
| 0 | 2 |
| 1 | 3 |
| 2 | 5 |
| 3 | 9 |
| 4 | 17 |
| 5 | 33 |

The decoding of the octant(layer, y,u,v) is a recursive function as shown in Table 4. Each octant is composed of 8 vertices associated with a flag (encoded_flag[i]) indicating whether the residual color values are encoded or all inferred to be zero. The color values are reconstructed by adding the residuals to the prediction of the color values. The prediction of the color values is computed using for example tri-linear interpolation of the 8 neighboring vertices of layer_id−1.

TABLE 5

| syntax elements for coding_octant( ) | |
| --- | --- |
| | Descriptor |
| coding_octant ( layer_id, y,u,v) { | |
| for( i = 0; i < 8 ; i++ ) { | |
| encoded_flag[i] | u(1) |
| if ( encoded_flag[i] ) { | |
| resY[j] | ue(v) |
| resU[j] | ue(v) |
| resV[j] | ue(v) |
| } | |
| } | |
| split_flag | u(1) |
| if ( split_flag ) { | |
| for( i = 0; i < 8 ; i++ ) { | |
| coding_octant ( layer_id+1, | |
| y+dy[i],u+du[i],v+dv[i]) | |
| } | |
| } | |
| } | |

According to another advantageous embodiment, the LUT is encoded in a SEI message (SEI stands for "Supplemental Enhancement Information"). The HEVC standard defines in its Annex D the way in which additional information termed SEI is coded. This additional information is referenced in the syntax by a field called payloadType. SEI messages assist for example in processes related to display. Note that if the decoding device does not possess the functionalities necessary for its use, this information is ignored. According to a specific embodiment of the invention, a new type of SEI message is defined so as to code additional information relating to the 3D LUT. For this purpose, a new value for the field payloadType is defined from among the values not yet used (for example payloadType is equal to 24).

The syntax of the SEI data (i.e. sei_payload) is extended in the following manner:

TABLE 6 color mapping SEI message

| | Descriptor |
|---|---|
| color_mapping_info( payloadSize ) { | |
|    color_map_id | ue(v) |
|    color_map_cancel_flag | u(1) |
|    if( !color_map_cancel_flag ) { | |
|       color_map_repetition_period | ue(v) |
|       color_description_present_flag | u(1) |
|       If (colour_description_present_flag) { | |
|          color_primaries_input_id | u(8) |
|          color_primaries_output_id | u(8) |
|       } | |
|       color_output_rgb | u(1) |
|       lut_bit_depth_minus8 | u(4) |
|       3D_LUT_color_data ( ) | |
|    } | |
| } | |

According to a variant, the SEI message further comprises an indicator color_interpolator_id, e.g. after color_description_present_flag, whose value indicates a type of interpolation as specified in Table 7.

TABLE 7 type of interpolation

| color_interpolator_id | 3D LUT size |
|---|---|
| 0 | Tri-linear |
| 1 | tetrahedral |

This SEI message provides information to enable remapping of the color samples of the output decoded pictures for customization to particular display environments. The remapping process maps coded sample values in the RGB color space to target sample values. The mappings are expressed either in the luma or RGB color space domain, and should be applied to the luma component or to each RGB component produced by color space conversion of the decoded picture accordingly.

3D_LUT_color data( ) is defined in Table 2 or 3.

The decoded 3D LUT is applied to decoded pictures belonging to a layer identified for example by the index nuh_layer_id of the NAL Unit Header (see section 7.3.1.2 of document HEVC coding standard defined in document JCTVC-L1003 of Joint Collaborative Team on Video Coding (JCT-VC) of ITU-T SG16 WP3 and ISO/IEC JTC1/SC29/WG11 of the SEI message.

color_map_id contains an identifying number that may be used to identify the purpose of the color mapping model. Values of color_map_id may be used as determined by the application. The color_map_id can be used to support color mapping operations that are suitable for different display scenarios. For example, different values of color_map_id may correspond to different display bit depths. color_map_cancel_flag equal to 1 indicates that the color mapping information SEI message cancels the persistence of any previous color mapping information SEI message in output order. color_map_cancel_flag equal to 0 indicates that color mapping information follows.

color_map_repetition_period specifies the persistence of the color mapping information SEI message and may specify a picture order count interval within which another color mapping information SEI message with the same value of color_map_id or the end of the coded video sequence shall be present in the bitstream. color_map_repetition_period equal to 0 specifies that the color map information applies to the current decoded picture only.

color_map_repetition_period equal to 1 specifies that the color map information persists in output order until any of the following conditions are true:

A new coded video sequence begins.

A picture in an access unit containing a color mapping information SEI message with the same value of color_map_id is output having a picture order count (known as POC) greater than the POC of the current decoded picture, denoted PicOrderCnt(CurrPic).

color_map_repetition_period equal to 0 or equal to 1 indicates that another color mapping information SEI message with the same value of color_map_id may or may not be present.

color_map_repetition_period greater than 1 specifies that the color map information persists until any of the following conditions are true:

A new coded video sequence begins.

A picture in an access unit containing a color mapping information SEI message with the same value of color_map_id is output having a POC greater than PicOrderCnt(CurrPic) and less than or equal to PicOrderCnt(CurrPic)+color_map_repetition_period.

color_map_repetition_period greater than 1 indicates that another color mapping information SEI message with the same value of color_map_id shall be present for a picture in an access unit that is output having a POC greater than PicOrderCnt(CurrPic) and less than or equal to PicOrderCnt(CurrPic)+color_map_repetition_period; unless the bitstream ends or a new coded video sequence begins without output of such a picture.

color_description_present_flag equal to 1 specifies that colour_primaries_input_id and colour_primaries_output_id are present. colour_description_present_flag equal to 0 specifies that colour_primaries_input_id and colour_primaries_output_id are not present.

color_primaries_input_id indicates the chromaticity coordinates of the source primaries as specified in Table 8 in terms of the CIE 1931 definition of x and y as specified by ISO 11664-1.

color_primaries_output_id indicates the chromaticity coordinates of the color mapped primaries as specified in Table 8 in terms of the CIE 1931 definition of x and y as specified by ISO 11664-1, once the 3D color lut is applied.

color_output_rgb equal to 1 specifies the output color samples are luma and chroma signals. color_output_rgb equal to 0 specifies the output color samples are green, red, blue values.

lut_bit_depth_minus 8 specifies the bit depth of the 3D LUT samples.

nbp_code indicates the 3D LUT size nbp as listed in Table 4 for the given value of nbp_code.

Figure 14:
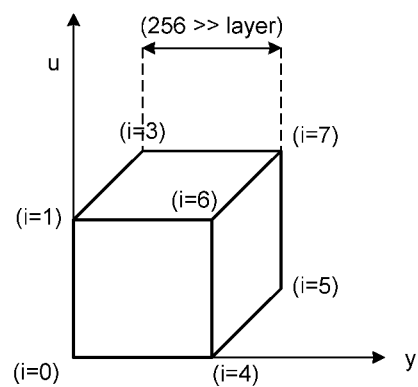
FIG. 14 depicts the position of the 8 vertices of an octant.

The ouput of the 3D LUT decoding is a 3 dimension array LUT of size nbp×nbp×nbp. Each LUT array element is called a vertex and is associated with 3 reconstructed sample values (recSamplesY, recSamplesU, recSamplesV) of bit depth equal to (lut_bit_depth_minus8+8). A vertex lut[i][j][k] is said to belonging to layer layer_id if the values of i%(nbp>>layer_id), j%(nbp>>layer_id), k%(nbp>>layer_id) are equal to zero. One vertex may belong to several layers. An octant of layer layer_id is composed of 8 neighboring vertices belonging to layer_id (FIG. 14).

The decoding of the octant(layer_id, y,u,v) is a recursive function. Each octant is composed of 8 vertices (i=0, . . . 7) associated with a flag (encoded_flag[i]) indicating whether the residual components values (resY[i],resU[i], resV[i]) are encoded or all inferred to be zero. The component values are reconstructed by adding the residuals to the prediction of the components values. The prediction of the components values is computed using tri-linear interpolation of the 8 neighboring vertices of layer_id−1. Once reconstructed a vertex is marked as reconstructed.

Where (y+dy[i]), (u+du[i]) and (v+dv[i]) are the 8 children octants coordinates (coordinates of the first 3D color vertex) of the current octant (having (y,u,v) as first vertex (i=0) coordinates). The values dy[i],du[i] and dv[i] for a given layer are depicted in Table 9.

TABLE 8

| Colour primaries (color_primaries_input_id and color_primaries_output_id) | | | | |
|---|---|---|---|---|
| Value | Primaries | | | Informative Remark |
| 0 | Reserved | | | For future use by ITU-T | ISO/IEC |
| 1 | primary | x | y | ITU-R Rec. BT.709-5 |
|   | green | 0.300 | 0.600 | ITU-R Rec. BT.1361 conventional colour |
|   | blue | 0.150 | 0.060 | gamut system and extended colour gamut |
|   | red | 0.640 | 0.330 | system |
|   | white D65 | 0.3127 | 0.3290 | IEC 61966-2-1 (sRGB or sYCC) |
|   |   |   |   | IEC 61966-2-4 |
|   |   |   |   | Society of Motion Picture and Television |
|   |   |   |   | Engineers RP 177 (1993) Annex B |
| 2 | Unspecified | | | Image characteristics are unknown or are |
|   |   |   |   | determined by the application. |
| 3 | Reserved | | | For future use by ITU-T | ISO/IEC |
| 4 | primary | x | y | ITU-R Rec. BT.470-6 System M (historical) |
|   | green | 0.21 | 0.71 | United States National Television System |
|   | blue | 0.14 | 0.08 | Committee 1953 Recommendation for |
|   | red | 0.67 | 0.33 | transmission standards for colour television |
|   | white C | 0.310 | 0.316 | United States Federal Communications |
|   |   |   |   | Commission Title 47 Code of Federal |
|   |   |   |   | Regulations (2003) 73.682 (a) (20) |
| 5 | primary | x | y | ITU-R Rec. BT.470-6 System B, G (historical) |
|   | green | 0.29 | 0.60 | ITU-R Rec. BT.601-6 625 |
|   | blue | 0.15 | 0.06 | ITU-R Rec. BT. 1358 625 |
|   | red | 0.64 | 0.33 | ITU-R Rec. BT.1700 625 PAL and 625 |
|   | white D65 | 0.3127 | 0.3290 | SECAM |
| 6 | primary | x | y | ITU-R Rec. BT.601-6 525 |
|   | green | 0.310 | 0.595 | ITU-R Rec. BT.1358 525 |
|   | blue | 0.155 | 0.070 | ITU-R Rec. BT.1700 NTSC |
|   | red | 0.630 | 0.340 | Society of Motion Picture and Television |
|   | white D65 | 0.3127 | 0.3290 | Engineers 170M (2004) |
|   |   |   |   | (functionally the same as the value 7) |
| 7 | primary | x | y | Society of Motion Picture and Television |
|   | green | 0.310 | 0.595 | Engineers 240M (1999) |
|   | blue | 0.155 | 0.070 | (functionally the same as the value 6) |
|   | red | 0.630 | 0.340 |   |
|   | white D65 | 0.3127 | 0.3290 |   |
| 8 | primary | x | y | Generic film (colour filters using Illuminant C) |
|   | green | 0.243 | 0.692 |   |
|   | (Wratten 58) |   |   |   |
|   | blue | 0.145 | 0.049 |   |
|   | (Wratten 47) |   |   |   |
|   | red | 0.681 | 0.319 |   |
|   | (Wratten 25) |   |   |   |
|   | white C | 0.310 | 0.316 |   |
| 9 | primary | x | y | Rec. ITU-R BT.2020 |
|   | green | 0.170 | 0.797 |   |
|   | blue | 0.131 | 0.046 |   |
|   | red | 0.708 | 0.292 |   |
|   | white D65 | 0.3127 | 0.3290 |   |
| 10 . . . 255 | Reserved | | | For future use by ITU-T | ISO/IEC |

TABLE 9 values dy[i], du[i] and dv[i] in function of index i, for vertices belonging to layer = layer_id.

| i | dy[i] | du[i] | dv[i] |
|---|---|---|---|
| 0 | 0 | 0 | 0 |
| 1 | 0 | 0 | nbp >> layer_id |
| 2 | 0 | nbp >> layer_id | 0 |
| 3 | 0 | nbp >> layer_id | nbp >> layer_id |
| 4 | nbp >> layer_id | 0 | 0 |
| 5 | nbp >> layer_id | 0 | nbp >> layer_id |
| 6 | nbp >> layer_id | nbp >> layer_id | 0 |
| 7 | nbp >> layer_id | nbp >> layer_id | nbp >> layer_id |

The reconstructed 3D color LUT samples (recSamplesY[i], recSamplesU[i], recSamplesV[i]) for the vertex ((y+dy[i]), (u+du[i]), (v+dv[i])) belonging to an octant of the layer=layer_id is given by:

$$recSamplesY[i] = resY[i] + predSamplesY[i]$$

where the value of predSampleY[i] is derived using tri-linear interpolation with the vertices of the octant of layer=layer_id−1 that contains the current octant.

Figure 12:
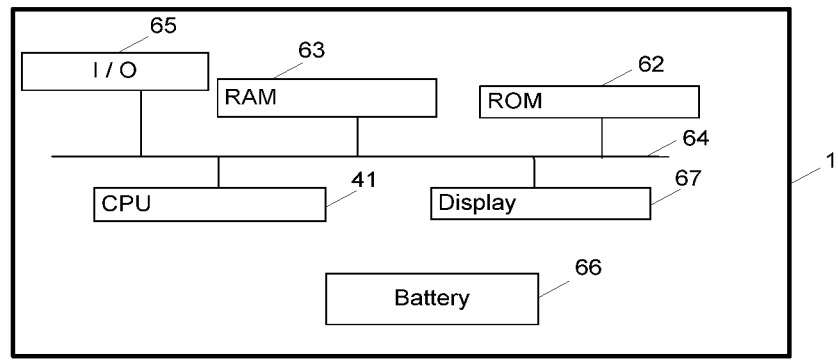
FIG. 12 diagrammatically shows an encoder for encoding a LUT according to the invention.

FIG. 12 represents an exemplary architecture of an encoder 1. The encoder is configured to execute the steps of the encoding method. Encoder 1 comprises following elements that are linked together by a data and address bus 64:
- a microprocessor 61 (or CPU), which is, for example, a DSP (or Digital Signal Processor);
- a ROM (or Read Only Memory) 62;
- a RAM (or Random Access Memory) 63;
- one or several I/O (Input/Output) devices 65 such as for example a keyboard, a mouse, a webcam; and
- a power source 66.

According to a variant, the power source 66 is external to the encoder. Each of these elements of FIG. 12 are well known by those skilled in the art and won't be disclosed further. In each of mentioned memory, the word «register» used in the specification designates in each of the memories mentioned, both a memory zone of low capacity (some binary data) as well as a memory zone of large capacity (enabling a whole program to be stored or all or part of the data representative of data calculated or to be displayed). ROM 62 comprises a program and encoding parameters (such as threshold TH). Algorithm of the encoding method according to the invention is stored in the ROM 62. When switched on, the CPU 61 uploads the program 620 in the RAM and executes the corresponding instructions.

RAM 63 comprises, in a register, the program executed by the CPU 61 and uploaded after switch on of the encoder 1, input data in a register, encoded data in different state of the encoding method in a register and other variables used for encoding in a register.

Figure 13:
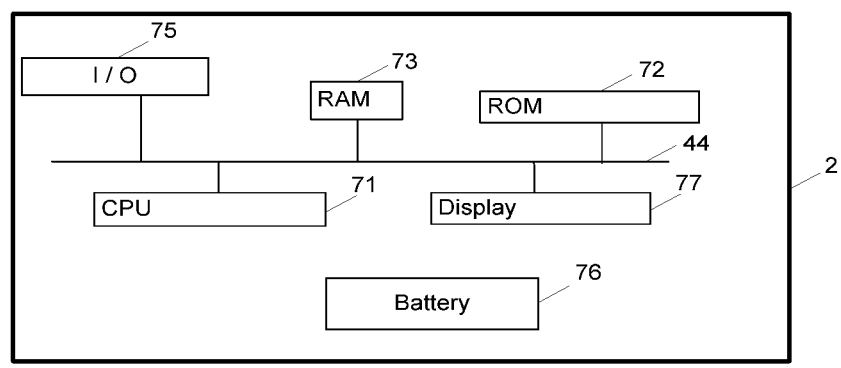
FIG. 13 diagrammatically shows a decoder for decoding a LUT according to the invention.

FIG. 13 represents an exemplary architecture of a decoder 2. The decoder is configured to execute the steps of the decoding method. Decoder 2 comprises following elements that are linked together by a data and address bus 74:
- a microprocessor 71 (or CPU), which is, for example, a DSP (or Digital Signal Processor);
- a ROM (or Read Only Memory) 72;
- a RAM (or Random Access Memory) 73;
- an I/O interface 75 for reception of data to transmit, from an application; and
- a battery 76.

According to a variant, the battery 76 is external to the encoder. Each of these elements of FIG. 13 are well known by those skilled in the art and won't be disclosed further. In each of mentioned memory, the word «register» used in the specification can correspond to area of small capacity (some bits) or to very large area (e.g. a whole program or large amount of received or decoded data). ROM 72 comprises at least a program and decoder parameters. Algorithm of the decoding method according to the invention is stored in the ROM 72. When switched on, the CPU 71 uploads the program 720 in the RAM and executes the corresponding instructions.

RAM 73 comprises, in a register, the program executed by the CPU 71 and uploaded after switch on of the decoder 2, input data in a register, decoded data in different state of the decoding method in a register, and other variables used for decoding in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted.

The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application. Specifically, the method for encoding a LUT according to the invention can be used for encoding any kind of LUT whatever the type of values associated with each vertex.

The invention claimed is:

1. A method for encoding a 3-dimensional color Look-Up Table defined as a lattice of vertices using an octree, the 3-dimensional color Look-Up Table storing at least one value for each vertex representing a set of input color values, the method comprising:
    encoding a split flag for a current octant of said octree indicating whether at least one of its immediate child octants is recursively encoded;
    predicting at least one value for a vertex in the current octant from a reconstruction of value(s) of at least one neighboring vertex to obtain a prediction;
    determining a residue computed between the at least one value for the vertex and the prediction;
    quantizing the residue to obtain quantized residue;
    entropy coding the quantized residue; and
    encoding the immediate child octants of said current octant if the split flag for said current octant is true.

2. The method according to claim 1, further comprising encoding a binary flag for said vertex indicating whether or not at least one residue is encoded for said vertex.

3. The method according to claim 1, wherein the at least one value for a vertex and the reconstruction of value(s) for the neighboring vertex are color values.

4. The method according to claim 3, wherein said color values are parameters for a color transform.

5. The method according to claim 1, wherein said at least one neighboring vertex used for obtaining said reconstruction of value(s) for said neighboring vertex belongs to a parent octant of the current octant.

6. A method for decoding a 3-dimensional color Look-Up Table defined as a lattice of vertices using an octree, the 3-dimensional color Look-Up Table storing at least one value for each vertex representing a set of input color values, the method comprising:
    decoding a split flag for a current octant of said octree indicating whether at least one of its immediate child octants should be recursively decoded;
    predicting at least one value for a vertex in the current octant from another value obtained from a reconstruction of value(s) for at least one neighboring vertex to obtain a prediction;
    entropy decoding an entropy-coded quantized residue of the at least one value for the vertex in the current octant to obtain a quantized residue;
    inverse quantizing the quantized residue of the at least one value for the vertex in the current octant to obtain a residue;
    reconstructing the at least one value for the vertex from the prediction and the residue; and
    decoding the immediate child octants of said current octant if the split flag for said current octant is true.

7. The method according to claim 6, further comprising decoding a binary flag for said vertex indicating whether or not at least one residue should be decoded for said vertex.

8. The method according to claim 6, the at least one value for a vertex, the reconstruction of value(s) for the neighboring vertex are color values.

9. The method according to claim 8, wherein said color values are parameters for a color transform.

10. The method according to claim 6, wherein said at least one neighboring vertex used for obtaining said reconstruction of value(s) for said neighboring vertex belongs to a parent octant of the current octant.

* * * * *